(12) United States Patent
Sahara et al.

(10) Patent No.: US 8,179,823 B2
(45) Date of Patent: May 15, 2012

(54) COMMUNICATION CONTROL METHOD, BASE STATION DEVICE, TERMINAL DEVICE, AND COMMUNICATION CONTROL SYSTEM USING TDD-OFDMA COMMUNICATION METHOD

(75) Inventors: Toru Sahara, Kanagawa (JP); Masamitsu Nishikido, Kanagawa (JP); Hironobu Tanigawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 75 days.

(21) Appl. No.: 12/443,423

(22) PCT Filed: Sep. 18, 2007

(86) PCT No.: PCT/JP2007/068097
§ 371 (c)(1),
(2), (4) Date: Sep. 4, 2009

(87) PCT Pub. No.: WO2008/038543
PCT Pub. Date: Apr. 3, 2008

(65) Prior Publication Data
US 2010/0097962 A1    Apr. 22, 2010

(30) Foreign Application Priority Data

Sep. 28, 2006  (JP) .................................. 2006-265934
Sep. 28, 2006  (JP) .................................. 2006-265935

(51) Int. Cl.
*H04J 3/00*   (2006.01)
(52) U.S. Cl. ........ 370/280; 370/208; 370/294; 370/350; 370/503; 370/491; 370/480; 370/498
(58) Field of Classification Search ........................ None
See application file for complete search history.

(56) References Cited

U.S. PATENT DOCUMENTS 5,839,071 A   11/1998  Johnson
(Continued)

FOREIGN PATENT DOCUMENTS

JP          09-266466         10/1997
(Continued)

OTHER PUBLICATIONS

Korean language office action dated Feb. 14, 2011 and its English language translation for corresponding Korean application 1020097006020.

(Continued)

*Primary Examiner* — Kibrom T Hailu
(74) *Attorney, Agent, or Firm* — DLA Piper LLP (US)

(57) ABSTRACT

In a communication system and a communication method using a TDD-OFDMA communication method, inter-carrier interference due to delay dispersion is prevented by suppressing the delay time within a guard interval.

In a base station device 10, based on a pilot symbol included in uplink information transmitted from a terminal device 20 through an assigned channel assigned by a channel assignment response, it is estimated whether a received timing of receiving the uplink information is early or late, the received timing estimation result is recorded in a timing recording unit, and when transmitting downlink information from the base station device 10, a transmission timing request is added to the downlink information based on content recorded in the timing recording unit and the downlink information is transmitted to the terminal device 20 (Step S15), and in the terminal device 20, the received transmission timing request is recorded in a transmission timing recording unit, and uplink information is transmitted from the terminal device 20 to the base station device 10 at a timing instructed by a transmission timing request (Step S16).

7 Claims, 10 Drawing Sheets

U.S. PATENT DOCUMENTS

| | | | |
|---|---|---|---|
| 6,047,181 | A | 4/2000 | Suonvieri |
| 6,330,459 | B1 * | 12/2001 | Crichton et al. ........... 455/562.1 |
| 6,633,559 | B1 | 10/2003 | Asokan et al. |
| 7,042,857 | B2 * | 5/2006 | Krishnan et al. .............. 370/329 |
| 7,492,828 | B2 * | 2/2009 | Keerthi ......................... 375/260 |
| 7,577,167 | B2 * | 8/2009 | Kikuchi et al. ............... 370/508 |
| 7,697,477 | B2 * | 4/2010 | Courtney ...................... 370/331 |
| 7,751,448 | B2 * | 7/2010 | Laroia et al. ................. 370/505 |
| 2002/0080024 | A1 * | 6/2002 | Nelson et al. ................. 340/503 |
| 2003/0058833 | A1 * | 3/2003 | Hashem et al. ............... 370/350 |
| 2003/0139152 | A1 * | 7/2003 | Doi et al. ...................... 455/101 |
| 2005/0282568 | A1 | 12/2005 | Keerthi |
| 2007/0053280 | A1 | 3/2007 | Uesugi |
| 2007/0093209 | A1 * | 4/2007 | Agrawal et al. ............. 455/63.1 |
| 2008/0039129 | A1 * | 2/2008 | Li et al. ......................... 455/522 |
| 2009/0046604 | A1 | 2/2009 | Matsumoto et al. |

FOREIGN PATENT DOCUMENTS

| | | |
|---|---|---|
| JP | 11-113049 | 4/1999 |
| JP | 2000-252947 | 9/2000 |
| JP | 2001-501061 | 1/2001 |
| JP | 2003-528483 | 9/2003 |
| JP | 2004-533769 | 11/2004 |
| JP | 2004-363721 | 12/2004 |
| JP | 2006-217415 | 8/2006 |
| WO | 9502307 A1 | 1/1995 |
| WO | 9508896 A1 | 3/1995 |
| WO | 0111907 A1 | 2/2001 |
| WO | 2006/075586 | 7/2006 |

OTHER PUBLICATIONS

Antti Toskala et al., "WCDMA for UMTS: Radio Access for Third Generation Mobile Communications, Physical Layer" WCDMA for UMTS: Radio Access for Third Generation Mobile Communications, John Wiley & Sons, pp. 99-184, 2004.

Extended European search report dated Jan. 11, 2011 for corresponding European application 07807486.1.

* cited by examiner

COMMUNICATION CONTROL METHOD, BASE STATION DEVICE, TERMINAL DEVICE, AND COMMUNICATION CONTROL SYSTEM USING TDD-OFDMA COMMUNICATION METHOD

RELATED APPLICATIONS

This application is a national stage of international application No. PCT/JP2007/068097 filed Sep. 18, 2007, which also claims the benefit of priority under 35 USC 119 to Japanese Patent Application No. 2006-265934 filed Sep. 28, 2006 and Japanese Patent Application No. 2006-265935 filed Sep. 28, 2006, the entire contents, all of which are incorporated herein by reference.

TECHNICAL FIELD

The present invention relates to a communication control method, a base station device, a terminal device, and a communication control system using a TDD-OFDMA communication method to which OFDMA is applied in addition to TDMA-TDD method.

BACKGROUND ART

As a wireless access scheme of a digital portable telephone system, a PHS system, etc., a TDMA (Time Division Multiple Access) and TDD (Time Division Duplex) scheme in which TDMA and TDD are combined has been adopted. Additionally, an OFDMA (Orthogonal Frequency Division Multiplexing Access) scheme using OFDMA has been proposed.

The OFDM is a scheme for dividing a carrier to modulate data into a plurality of "subcarriers" (subdivided carriers) orthogonal to each other and distributing and transmitting a data signal in each subcarrier.

Hereinafter, the overview of the OFDM scheme will be described.

FIG. 8 is a block diagram showing a configuration of an OFDM modulation device to be used at a transmitting side. Transmission data is input to the OFDM modulation device. The transmission data is supplied to a serial/parallel conversion unit 201 and converted into data configured from a plurality of low-speed transmission symbols. That is, a plurality of low-speed digital signals are generated by dividing transmission information. Parallel data is supplied to an inverse fast Fourier transform (IFFT) unit 202.

The parallel data is allocated to each subcarrier configuring OFDM and mapped in a frequency domain. Here, each subcarrier is modulated by BPSK, QPSK, 16QAM, 64QAM, etc. The mapping data is transformed from frequency-domain transmission data to time-domain transmission data by performing an IFFT operation. Thereby, multicarrier modulation signals into which a plurality of subcarriers orthogonal to each other are modulated independently are generated. An output of the IFFT unit 202 is supplied to a guard interval adding unit 203.

As shown in FIG. 10, the guard interval adding unit 203 sets a rear part of an effective symbol of transmission data as a guard interval and adds its copy to a front part of an effective symbol period for every transmission symbol. A base-band signal obtained by the guard interval adding unit is supplied to an orthogonal modulation unit 204.

The orthogonal modulation unit 204 orthogonally modulates a base-band OFDM signal supplied from the guard interval adding unit 203 using a carrier signal supplied from a local oscillator 105 of the OFDM modulation device, and performs frequency conversion into an intermediate frequency (IF) signal or a radio frequency (RF) signal. That is, after frequency-converting the base-band signal into a desired transmission frequency band, the orthogonal modulation unit outputs it to a transmission path.

FIG. 9 is a block diagram showing a configuration of an OFDM demodulation device to be used at a receiving side. An OFDM signal generated by the OFDM modulation device of FIG. 8 is input to the OFDM demodulation device through a predetermined transmission path.

An OFDM reception signal input to the OFDM demodulation device is supplied to an orthogonal demodulation unit 211. The orthogonal demodulation unit 211 orthogonally demodulates the OFDM reception signal using a carrier signal supplied from a local oscillator 212 of the OFDM demodulation device, performs frequency conversion from an RF signal or an IF signal to a base-band signal, and obtains a base-band OFDM signal. The OFDM signal is supplied to a guard interval removing unit 213.

The guard interval removing unit 213 removes a signal added by the guard interval adding unit 203 of the OFDM modulation device according to a timing signal supplied from a symbol timing synchronizing unit (not shown). A signal obtained by the guard interval removing unit 213 is supplied to a fast Fourier transform (FFT) unit 214.

The FFT unit 214 performs transformation to frequency-domain reception data by performing an FFT operation on input time-domain reception data. De-mapping is performed in the frequency domain and parallel data is generated for each subcarrier. Here, the demodulation to the modulation of BPSK, QPSK, 16QAM, 64QAM, etc. performed for each subcarrier is performed. Parallel data obtained by the FFT unit 214 is supplied to a parallel/serial conversion unit 215 and output as reception data.

Similar to the above-described OFDM, OFDMA is a method in which a carrier wave is divided into a plurality of sub-carriers, however, it is different from OFDM in that the divided sub-carriers are grouped. Sub-carriers in the group are called "sub-channels," and a single user occupies these sub-channels or a plurality of users share the sub-channels.

In a wireless transmission path, a signal transmitted from a terminal side propagates through space and is received by a base station side, however, if a plurality of obstacles such as buildings and mountains are present in the transmission path, a reflected wave reflected by an obstacle may reach the base station later than a direct wave. This is called a delay wave, and the delay wave and the direct wave are different in transmission distance from each other, so that the received timings spread due to an influence in the plurality of paths (multipath) on the base station side. The base station sets a timing with the best conditions (for example, the highest transmission power) among these timings as a desired timing. Accordingly, timings other than the desired timing may be distributed before and after the desired timing.

In a communication system adopting a multi-access method in which a plurality of data are simultaneously transmitted from a plurality of terminals to a base station, when the distance to the base station is different among the terminals, the timings at which signals from the terminals arrive at the base station are different. Further, in combination with the above-described influence in the plurality of paths (multipath), the spread of the timings is further increased, and inter-carrier interference may occur.

As a technique for compensating for the inter-carrier interference caused by the above-described propagation delay, Patent Document 1 describes a method in which a temporal alignment control signal is supplied to a plurality of transceivers which transmit signals repeatedly to a common transceiver. Arrival times of signals each of which is transmitted from each of a plurality of transceivers to a common transceiver are detected, and advances and delays of signals which should be transmitted next to the common transceiver are determined so that signals transmitted subsequently from the plurality of transceivers arrive substantially within a predetermined period. To the plurality of transceivers, timing control signals including an advance or delay of the transceivers are transmitted so that the signals transmitted next from substantially all transceivers are advanced or delayed by the amounts determined by the advances and delays included in the timing control signals.

Patent Document 2 describes a method for time synchronization between a part of a plurality of user devices and a head-end device by presumptively calculating a moment at which OFDM symbols are transmitted to a head-end device so that the head-end device can receive the OFDM symbols at a predetermined moment.

Besides the timing control described in the above-described patent document, as a method for eliminating inter-carrier interference, generally, a method in which guard intervals are added is adopted by the terminal side. The guard interval is, as shown in FIG. 10, a copy of the same signal as a part X of the latter half of an effective symbol to the first half of the effective symbol.

On the base station side, by ignoring information on this guard interval, even if only a certain carrier delays, as long as the delay time is within this guard interval, a discontinuous point of the symbols does not occur in sub-carriers after the guard intervals are removed, and even after FFT, interference with an adjacent sub-carrier does not occur, so that the delay is ignored and correct receiving is performed. In the guard interval, data in the effective symbol is copied and inserted, so that even if a certain carrier delays, lack of information does not occur.

Patent Document 1: Japanese Translation of International Application (Kohyo) No. JP-A-2003-528483
Patent Document 2: Japanese Translation of International Application (Kohyo) No. JP-A-2004-533769

DISCLOSURE OF THE INVENTION

Problem to be Solved by the Invention

However, if the transmission distance between a terminal and a base station increases, the delay dispersion increases, and a delay wave may be made incident over the guard interval length. In a system in which random access control is performed between a terminal and a base station, a period of communication between the base station and the terminal becomes intermittent, and a difference in a transmission timing in the terminal increases, and if the delay time exceeds the guard interval, the possibility of interference with an adjacent carrier increases.

Therefore, the present invention was made for solving the above-described problem, and an object thereof is to prevent inter-carrier interference due to delay dispersion by suppressing the delay time within the guard interval.

Means for Solving the Problem

The present invention which can solve the above-described problem provides a communication control method in which channel assignment responses are made in downlink information from a base station device by using a TDD-OFDMA communication method between the base station device and a plurality of terminal devices in response to channel assignment requests included in uplink information from the terminal devices, including
 in the base station device,
 a step of estimating, based on a pilot symbol included in uplink information transmitted from the terminal device through an assigned channel assigned by the channel assignment response, whether a received timing of receiving the uplink information is earlier or later than a reference;
 a step of recording the received timing estimation result in a timing recording unit; and
 a step of transmitting downlink information from the base station device to the terminal device by adding a transmission timing request based on content recorded in the timing recording unit; and
 in the terminal device,
 a step of recording the received transmission timing request in a transmission timing recording unit; and
 a step of transmitting uplink information from the terminal device to the base station device at a timing instructed by the transmission timing request.

The communication control method of the present invention further includes a step of estimating whether a received timing of receiving uplink information after it is transmitted from the terminal device through the assigned channel is earlier or later than a reference based on a pilot symbol included in the uplink information.

The communication control method of the present invention includes a plurality of determination levels in estimation as to whether the received timing is earlier or later than the reference.

Further, the present invention which can solve the above-described problem provides a base station device which makes channel assignment responses in downlink information to a plurality of terminal devices by using a TDD-OFDMA communication method in response to channel assignment requests included in uplink information from the terminal devices, including:
 a timing estimating unit for estimating, based on a pilot symbol included in uplink information transmitted from the terminal device through an assigned channel assigned by the channel assignment response, whether a received timing of receiving the uplink information is earlier or later than a reference;
 a timing recording unit for recording the received timing estimation result; and
 a transmission timing request adding unit for adding a transmission timing request based on content recorded in the timing recording unit when transmitting the downlink information.

The present invention which can solve the above-described problem provides a terminal device which transmits uplink information to a base station device through an assigned channel assigned by a channel assignment response transmitted from the base station device by using a TDD-OFDMA communication method, including:
 a transmission timing recording unit for recording a transmission timing request added to downlink information from the base station device; and
 a transmission timing changing unit for transmitting uplink information to the base station device at a timing instructed by the transmission timing request when transmitting the uplink information from the terminal device.

The present invention which can solve the above-described problem provides a communication control system which makes channel assignment responses in downlink information from a base station device by using a TDD-OFDMA communication method between the base station device and a plurality of terminal devices in response to channel assignment requests included in uplink information from the terminal devices, wherein the base station device includes:

a timing estimating unit for estimating, based on a pilot symbol included in uplink information transmitted from the terminal device through an assigned channel assigned by the channel assignment response, whether a received timing of receiving the uplink information is earlier or later than a reference;

a timing recording unit for recording the received timing estimation result; and a transmission timing request adding unit for adding a transmission timing request based on content recorded in the timing recording unit when transmitting the downlink information, and the terminal device includes:

a transmission timing recording unit for recording a transmission timing request added to downlink information from the base station device; and a transmission timing changing unit for transmitting uplink information to the base station device at a timing instructed by the transmission timing request when transmitting the uplink information from the terminal device.

The present invention which can solve the above-described problem provides a communication control method in which channel assignment responses are made in downlink information from a base station device by using a TDD-OFDMA communication method between the base station device and a plurality of terminal devices in response to channel assignment requests included in uplink information from the terminal devices, including:

a step of raising the level of transmission power in a phased manner from a low level to a high level to transmit a channel assignment request from the terminal device to the base station device; and a step for transmitting the channel assignment response when the base station device confirms a channel assignment request from the terminal device.

The present invention which can solve the above-described problem provides a communication control method in which channel assignment responses are made in downlink information from a base station device by using a TDD-OFDMA communication method between the base station device and a plurality of terminal devices in response to channel assignment requests included in uplink information from the terminal devices, including:

a step of estimating whether a received timing of receiving the uplink information is earlier or later than a reference based on a pilot symbol included in the channel assignment request when the base station device confirms the channel assignment request from the terminal device; and a step of transmitting a transmission timing request to the terminal device based on the received timing estimation result.

In the present invention, the base station device:

transmits the channel assignment response for rejecting channel assignment when the received timing of the channel assignment request is out of a reference range; and transmits the channel assignment response for performing the channel assignment to the terminal device when the received timing of the channel assignment request is in the reference range.

Further, the communication control method of the present invention includes:

a step of recording the received timing estimation result in a timing recording unit; and a step of transmitting a response relating to the channel assignment from the base station device to the terminal device by adding the transmission timing request based on content recorded in the timing recording unit, to be performed by the base station device, and a step of recording the received transmission timing request in the transmission timing recording unit; and a step of transmitting uplink information from the terminal device to the base station device at a timing instructed by the transmission timing request, to be performed by the terminal device.

The present invention which can solve the above-described problem provides a base station device which makes communication with a plurality of terminal devices by using a TDD-OFDMA communication method, including:

a timing estimating unit for estimating, when the base station device confirms a channel assignment request transmitted by raising transmission power in a phased manner from a low level to a high level when a channel assignment request is transmitted from the terminal device, whether a timing of receiving the channel assignment request is earlier or later than a prescribed timing set in advance in the base station device based on a pilot symbol included in the channel assignment request;

a timing recording unit for recording the transmission timing request based on the estimation result; and a transmission timing request adding unit for adding the transmission timing request to a channel assignment response from the base station device based on content recorded in the timing recording unit.

The present invention which can solve the above-described problem provides a terminal device which makes communication with a plurality of terminal devices by using a TDD-OFDMA communication method, including:

a transmission power adjusting unit for raising transmission power in a phased manner from a low level to a high level to transmit a channel assignment request;

a transmission timing recording unit for recording a received transmission timing request; and a transmission timing adjusting unit for transmitting uplink information from the terminal device to the base station device at a timing instructed by the transmission timing request.

The present invention which can solve the above-described problem provides a communication control system which makes channel assignment responses in downlink information from a base station device by using a TDD-OFDMA communication method between the base station device and a plurality of terminal devices in response to channel assignment requests included in uplink information from the terminal devices, wherein the base station device includes:

a timing estimating unit for estimating, when the base station device confirms a channel assignment request transmitted by raising transmission power in a phased manner from a low level to a high level when a channel assignment request is transmitted from the terminal device, whether a timing of receiving the channel assignment request is earlier or later than a prescribed timing set in advance in the base station device based on a pilot symbol included in the channel assignment request;

a timing recording unit for recording a transmission timing request based on the timing estimation result; and a transmission timing request adding unit for adding the transmission timing request to the channel assignment response from the base station device based on content recorded in the timing recording unit, and the terminal device includes:

a transmission power adjusting unit for raising transmission power in a phased manner from a low level to a high level to transmit the channel assignment request;

a transmission timing recording unit for recording a received transmission timing request; and a transmission timing adjusting unit for transmitting uplink information from the terminal device to the base station device at a timing instructed by the transmission timing request.

Advantages of the Invention

According to the present invention, in a communication system and a communication method using a TDD-OFDMA communication method, by suppressing a delay time within a guard interval, inter-carrier interference due to delay dispersion can be prevented. Further, by performing timing control through an always connected assignment channel, interference with an adjacent carrier due to a timing difference from the terminal device can be prevented even in a random access system.

According to the present invention, by suppressing a delay time caused by a difference in a transmission timing at a channel assignment request timing within a guard interval, inter-carrier interference due to delay dispersion can be prevented. By increasing transmission power for requesting the first channel assignment in order from a small power, uplink adjacent channel interference and interference with other cells can be reduced.

DESCRIPTION OF SYMBOLS

1: transceiver, 2: signal processor, 2-1: symbol synchronization unit, 2-2: memory, 2-3: FFT unit, 2-4: frequency estimation unit (channel estimation unit), 2-5: timing estimation unit, 2-6: demodulator (decoder), 2-7: physical layer frame forming unit (transmission timing request adding unit), 2-8: modulation encoder, 2-9: IFFT unit, 10: base station device, 22: signal processor, 12-1: symbol synchronization unit, 12-2: memory, 12-3: FFT unit, 12-4: frequency estimation unit (channel estimation unit), 12-5: timing estimation unit, 12-6: demodulator (decoder), 12-7: physical layer frame forming unit, 12-8: modulation encoder, 12-9: IFFT unit, 12-10: timing request extraction unit, 12-11: timing shift unit, 12-12: transmission power controller, 20, 30: terminal device

BEST MODE FOR CARRYING OUT THE INVENTION

First Embodiment

Figure 1:
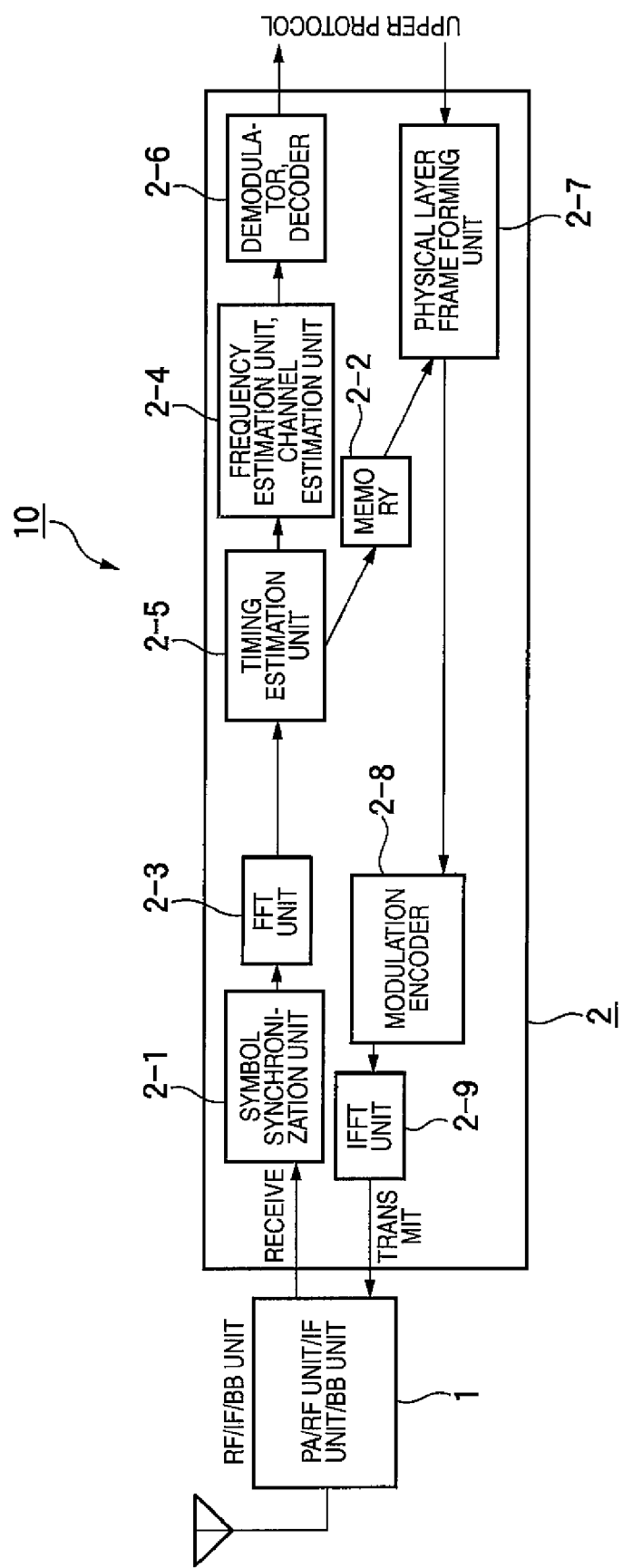
FIG. 1 is a functional block diagram of a base station device of a first embodiment of the present invention.

Hereinafter, a first embodiment of a communication control method, a base station device, a terminal device, and a communicating control system using a TDD-OFDMA communication method of the present invention will be described in detail with reference to the drawings. FIG. 1 is a functional block diagram of a base station device of an embodiment of the present invention.

The base station device 10 of the present embodiment includes a transceiver 1 (PA/RF unit/IF unit/BB unit) and a signal processor 2 which processes received signals.

In the transceiver 1, a signal received from an antenna passes through the RF unit and the IF unit, and an OFDMA signal of a base band signal can be obtained.

The signal processor 2 includes a symbol synchronization unit 2-1, a memory 2-2, an FFT unit 2-3, a frequency estimation unit (channel estimation unit) 2-4, a timing estimation unit 2-5 (timing estimating unit), a demodulator (decoder) 2-6, a physical layer frame forming unit 2-7 (transmission timing request adding unit), a modulation encoder 2-8, and an IFFT unit 2-9.

The symbol synchronization unit 2-1 performs symbol synchronization of the OFDMA signal obtained from the transceiver 1, removes guard intervals (GI), and according to FFT performed by the FFT unit 2-3, extracts symbols of users from the OFDMA signal. Then, the timing estimation unit 2-5 performs timing estimation, and from the timing estimation result, stores whether a received timing of receiving uplink information is earlier or later than a reference in the memory 2-2 (timing recording unit).

The frequency estimation unit (channel estimation unit) 2-4 performs frequency estimation and channel estimation, and the demodulator (decoder) 2-6 performs demodulation and decoding to extract data, and performs error check and delivers the data to the upper layer. Along with this, a transmission timing control bit of the sub-channel is set so that the data is transmitted late to the terminal device 20 when the received timing stored in the memory 2-2 is earlier, and the data is transmitted early when the received timing is later.

The physical layer frame forming unit 2-7 forms physical layer frames of sub-channels, and the modulation encoder 2-8 performs encoding and modulation. The IFFT unit 2-9 applies IFFT and adds guard intervals (GI), and converts the data into an analog signal, and adds a transmission timing control bit thereto and the analog signal is converted into an RF frequency signal through the IF unit and the RF unit of the transceiver 1, and transmitted from the antenna through the PA unit.

Figure 2:
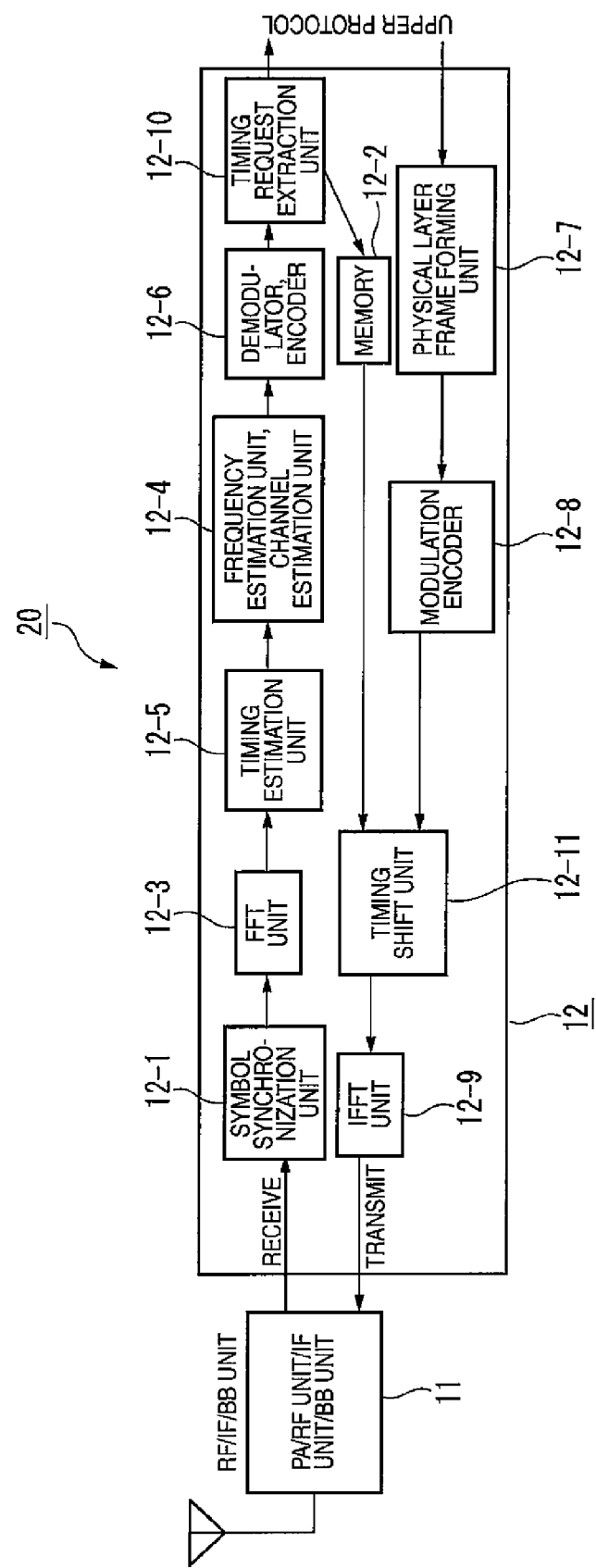
FIG. 2 is a functional block diagram of a terminal device of the first embodiment of the present invention.

Next, a functional configuration of a terminal device of an embodiment of the present invention will be described. FIG. 2 is a functional block diagram of the terminal device.

The terminal device 20 of the present embodiment includes a transceiver 11 (PA/RF unit/IF unit/BB unit) and a signal processor 22 which processes received signals.

In the transceiver 11, a signal received from an antenna passes through the RF unit and the IF unit, and an OFDMA signal of a base band signal can be obtained.

The signal processor 22 includes a symbol synchronization unit 12-1, a memory 12-2, an FFT unit 12-3, a frequency estimation unit (channel estimation unit) 12-4, a timing estimation unit 12-5, a demodulator (decoder) 12-6, a physical layer frame forming unit 12-7, a modulation encoder 12-8, an IFFT unit 12-9, a timing request extraction unit 12-10, and a timing shift unit 12-11 (transmission timing changing unit).

The symbol synchronization unit 12-1 performs symbol synchronization, removes guard intervals (GI), and according to FFT performed by the FFT unit 12-3, extracts symbols from the OFDMA signal. Thereafter, the timing estimation unit 12-5 performs timing estimation, and the frequency estimation unit (channel estimation unit 12-4) performs frequency estimation and channel estimation. Then, the demodulator (decoder) 12-6 performs demodulation and decoding to extract data, and the timing request extraction unit 12-10 records a state of the transmission timing control bit added to the sub-channel in the memory 12-2 (transmission timing recording unit), and performs error check and delivers the data to the upper layer.

The physical layer frame forming unit 12-7 forms physical layer frames of sub-channels, and the modulation encoder 12-8 performs encoding and modulation. Thereafter, the timing shift unit 12-11 (transmission timing changing unit) performs transmission timing control relatively to determine whether uplink information is to be transmitted early or late from the terminal device 20 according to a transmission timing control bit (transmission timing request) stored in the memory 12-2. The IFFT unit 12-9 applies IFFT and adds guard intervals (GI), and the data passes through DA and is converted into an analog signal, and then converted into an RF frequency signal through the IF unit and RF unit of the transceiver 11, and transmitted from the antenna through the PA unit.

Figure 3:
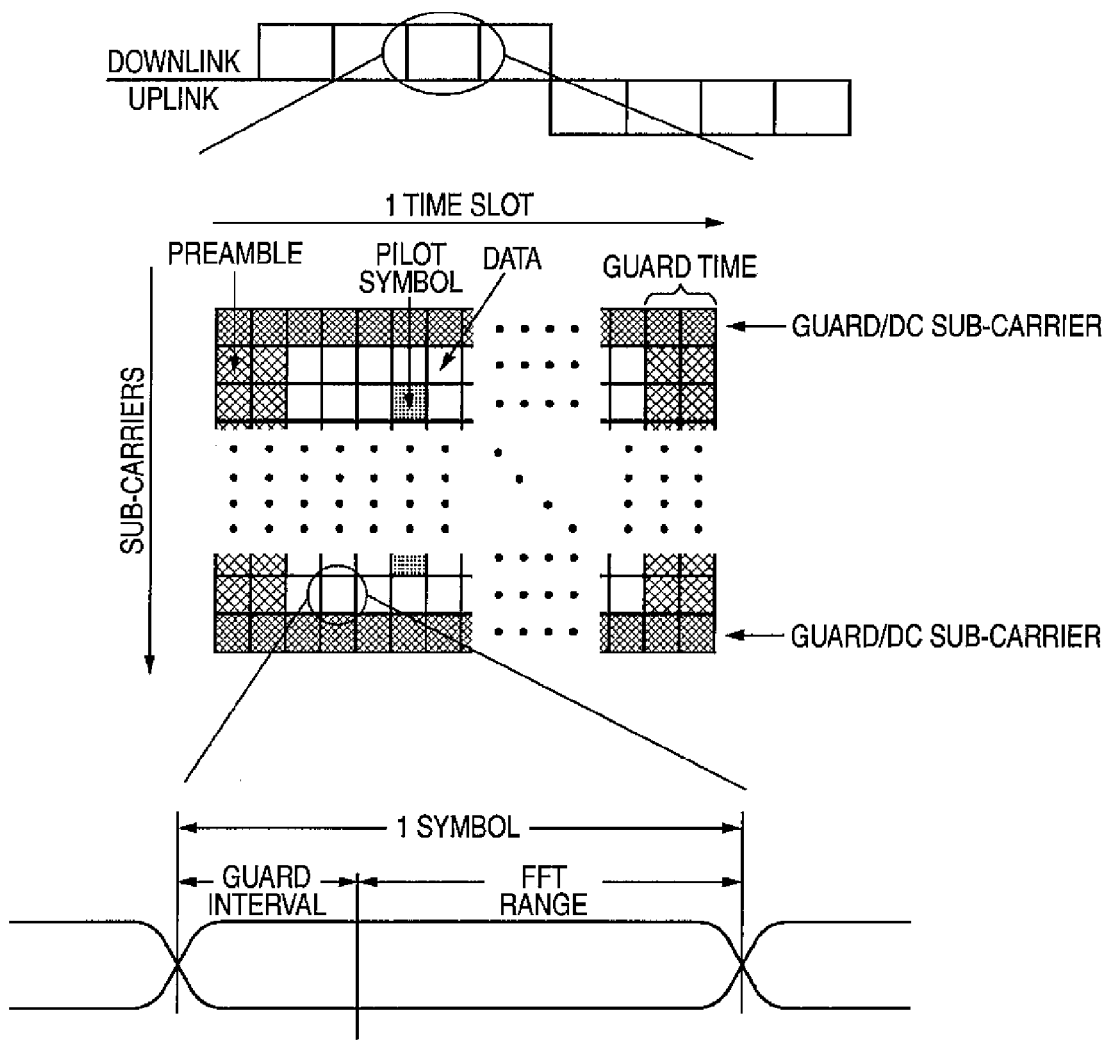
FIG. 3 is an explanatory view showing a sub-channel format.

Next, a format of sub-channels composing an OFDMA frame will be described with reference to FIG. 3. FIG. 3 is an explanatory view showing a sub-channel format.

As shown in FIG. 3, one frequency band consists of four downlink sub-channels and four uplink sub-channels.

Each sub-channel is further divided into OFDM sub-carriers on a frequency axis and OFDM symbols on a time axis. The sub-carriers are classified into sub-carriers for carrying information, etc., necessary for communication, guard sub-carriers for reducing influences of other carriers on the frequency axis, and DC sub-carriers which become DC components unnecessary for communication, etc. Sub-carriers of the respective symbols consist of a preamble, a pilot symbol, a guard time, a guard interval, and data, etc. Each symbol consists of a time length (FFT range of FIG. 3) necessary for FFT and a guard interval.

The preamble is a signal for recognition of start of frame transmission and instructing a synchronization timing.

The pilot symbol (PS) is a known signal waveform or known data for obtaining a phase reference for correct recognition of an absolute phase of each sub-carrier.

The guard time (GT) is a portion for preventing overlap of bursts from terminal devices due to differences in distance between the terminal devices and the base station device and a transmission timing error.

The guard interval (GI) is a portion for preventing inter-sub-carrier interference by properly selecting an FFT timing even if arrival waves arriving at a plurality of different timings overlap and timing dispersion occurs and adjacent symbols overlap.

The guard interval is a portion obtained by extending cyclically an output signal from the IFFT unit 2-9 or IFFT unit 12-9, and is added to each symbol. By adding the guard interval, as long as a timing of cutting a signal periodically input into the FFT unit 2-3 or FFT unit 12-3 is within the OFDM symbol including the guard interval, any portion can be demodulated without deterioration. In other words, even if a delay time component is included in one symbol, when the delay time is shorter than the guard interval, an adjacent symbol component does not enter therein, so that inter-symbol interference does not occur.

In the present embodiment, a total delay time including a delay time caused by multipath and a delay time caused by differences in distance to the base station among the terminals can be suppressed within the guard interval.

The timing estimation unit 2-5 of the base station device 10 estimates whether a received timing of receiving uplink information from the terminal device is earlier or later than a reference timing, that is, a desired timing of the base station device by calculating the correlation between a known symbol such as the pilot symbol PS or preamble PR of each sub-channel and a received signal. The timing extraction unit 12-10 of the terminal device 20 extracts a transmission timing control bit added as a transmission timing request to the sub-channel carrying downlink information from the base station device 10.

The timing detection according to the known symbol can also be performed by calculating the correlation with a known time axis waveform in a timing detection block, for example, in the symbol synchronization unit 2-1 before FFT (including the time before removing GI).

Figure 4:
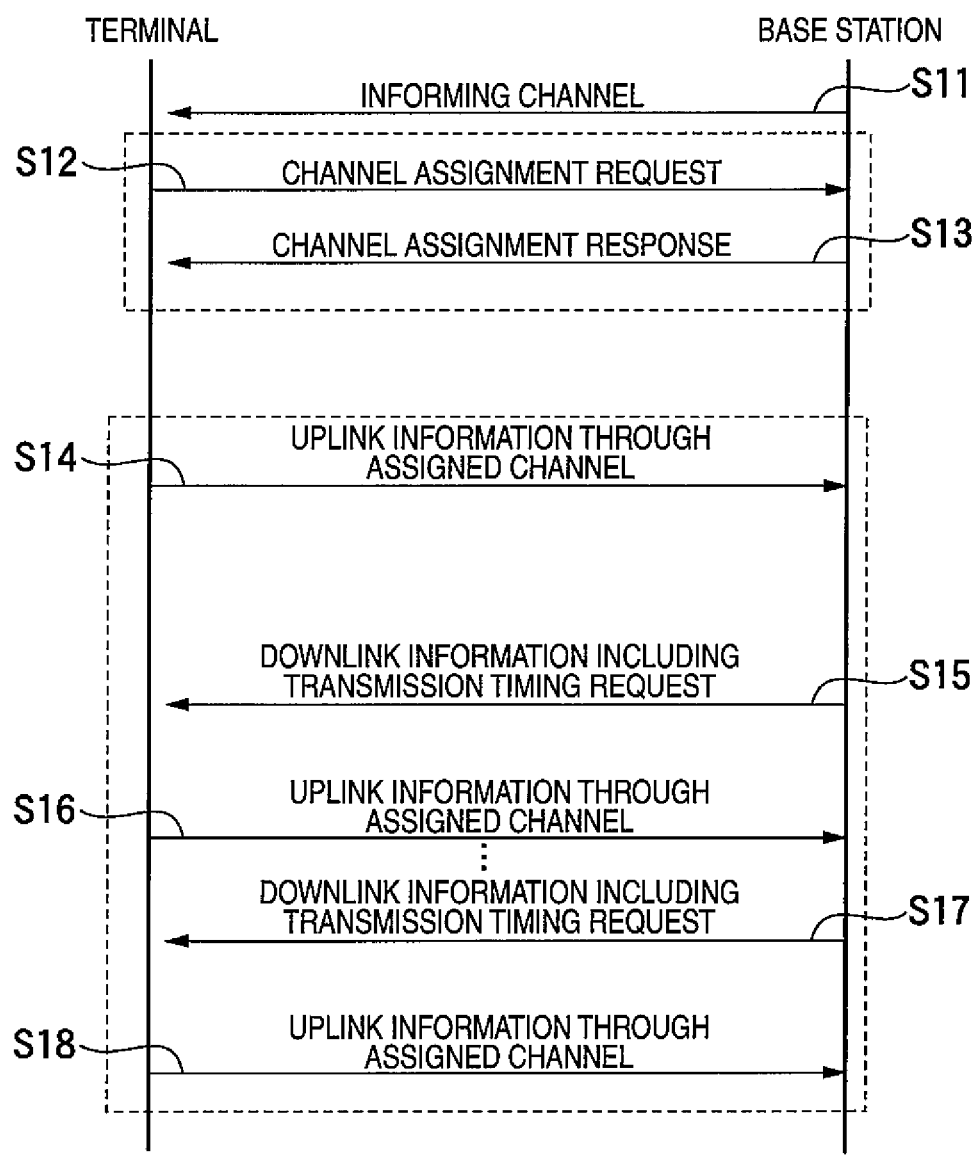
FIG. 4 is a flowchart describing timing control processing to be performed between the base station device and the terminal device of the first embodiment.

Next, a communication control method between the base station terminal 10 and the terminal device 20 of the present embodiment will be described in detail with reference to FIG. 4. FIG. 4 is a flowchart describing timing control processing to be performed between the base station terminal 10 and the terminal device 20 of the present embodiment.

First, the terminal device 20 performs frame synchronization with an informing channel of the base station device 10 in advance (Step S11), and at the time of call connection, outputs a channel assignment request (Step S12). At the call connection time point, the terminal device 20 transmits the quality condition of downlink communication of each channel to the base station device 10. The base station device 10 also monitors the uplink communication quality condition, and according to mutual communication quality conditions, assigns a channel with the best communication quality to the anchor sub-channel. Here, the anchor sub-channel is a sub-channel which is used for notifying which terminal device uses which sub-channel to each terminal device or is used for negotiating whether data has been correctly exchanged by re-transmission control between the base station device and the terminal device.

When the base station device 10 confirms a channel assignment request from the terminal device 20, it measures whether the received timing of the channel assignment request is later or earlier than a reference timing, and transmits a channel assignment response to the channel assignment request upon adding information showing how much the timing differs (Step S13).

The terminal device 20 adjusts the timing so that the transmission becomes earlier according to a transmission timing shift amount included in information in the channel assignment response, and transmits uplink information through the assigned channel (Step S14). The base station device 10 estimates an average received timing of the terminal device 20 based on the pilot symbol of the uplink information. When the estimated timing is late, the base station device sets the estimated timing as a transmission timing control bit in the anchor sub-channel of downlink information of the terminal device 20 so as to transmit the information early to the terminal device 20. When the estimated timing is early, the base station device sets the estimated timing as a transmission timing control bit in the anchor sub-channel of downlink information of the terminal device 20 so as to transmit the information late to the terminal device 20. The base station device 10 includes this transmission timing control bit as a transmission timing request into downlink information and transmits the downlink information including this transmission timing control bit together with other downlink information to the terminal device 20 (Step S15).

The transmission timing request can include not only a single determination level of determining whether the transmission timing is made early or late but also a plurality of determination levels of determining how much the transmission timing will be made early or late.

The terminal device 20 receives downlink information and adjusts the transmission timing of uplink information according to the transmission timing bit of the anchor sub-channel, and transmits the uplink information through an assigned channel (Step S16). It is also possible that, after Step S14, concerning the uplink information (Step S16) transmitted from the terminal device 20 through the assigned channel, it is estimated whether the received timing of receiving the uplink information is early or late based on the pilot symbol included in the uplink information, and the same processing as in Step S15 is repeated (Step S17, Step S18 . . . ).

Second Embodiment

Hereinafter, a second embodiment of a communication control method, a base station device, a terminal device, and a communication control system using a TDD-OFDMA communication method of the present invention will be described in detail with reference to the drawings. The communication control system of the present embodiment includes the base station device 10 shown in FIG. 1 and the terminal device 30 shown in FIG. 5.

The base station device 10 includes a transceiver 1 (PA/RF unit/IF unit/BB unit) and a signal processor 2 which processes received signals.

In the transceiver 1, a signal received from an antenna passes through the RF unit and the IF unit, and an OFDMA signal of a base band signal can be obtained.

The signal processor 2 includes a symbol synchronization unit 2-1, a memory 2-2, an FFT unit 2-3, a frequency estimation unit (channel estimation unit) 2-4, a timing estimation unit 2-5 (timing estimating unit), a demodulator (decoder) 2-6, a physical layer frame forming unit 2-7 (transmission timing request adding unit), a modulation encoder 2-8, and an IFFT unit 2-9.

The symbol synchronization unit 2-1 performs symbol synchronization of the OFDMA signal obtained from the transceiver 1, removes guard intervals (GI), and according to FFT performed by the FFT unit 2-3, extracts symbols of users from the OFDMA signal. Thereafter, the timing estimation unit 2-5 performs timing estimation, and from the timing estimation result, stores information on how much the received timing of receiving a channel assignment request is earlier or later than the reference in the memory 2-2 (timing recording unit).

The frequency estimation unit (channel estimation unit) 2-4 performs frequency estimation and channel estimation, and the demodulator (decoder) 2-6 performs demodulation and decoding to extract data, and performs error check and delivers the data to the upper layer. Thereafter, in response information relating to channel assignment, a transmission timing shift amount stored in the memory 2-2 is set. The response relating to the channel assignment includes a channel assignment response for channel assignment to the terminal device 30 by the base station device 10 and a channel assignment rejection for rejecting channel assignment to the terminal device 30 by the base station device 10.

The physical layer frame forming unit 2-7 forms physical layer frames of sub-channels, and the modulation encoder 2-8 performs encoding and modulation. The IFFT unit 2-9 applies IFFT and adds guard intervals (GI), and the data is converted into an analog signal through DA, and then converted into an RF frequency signal through the IF unit and RF unit of the transceiver 1, and transmitted from the antenna through the PA unit.

Figure 5:
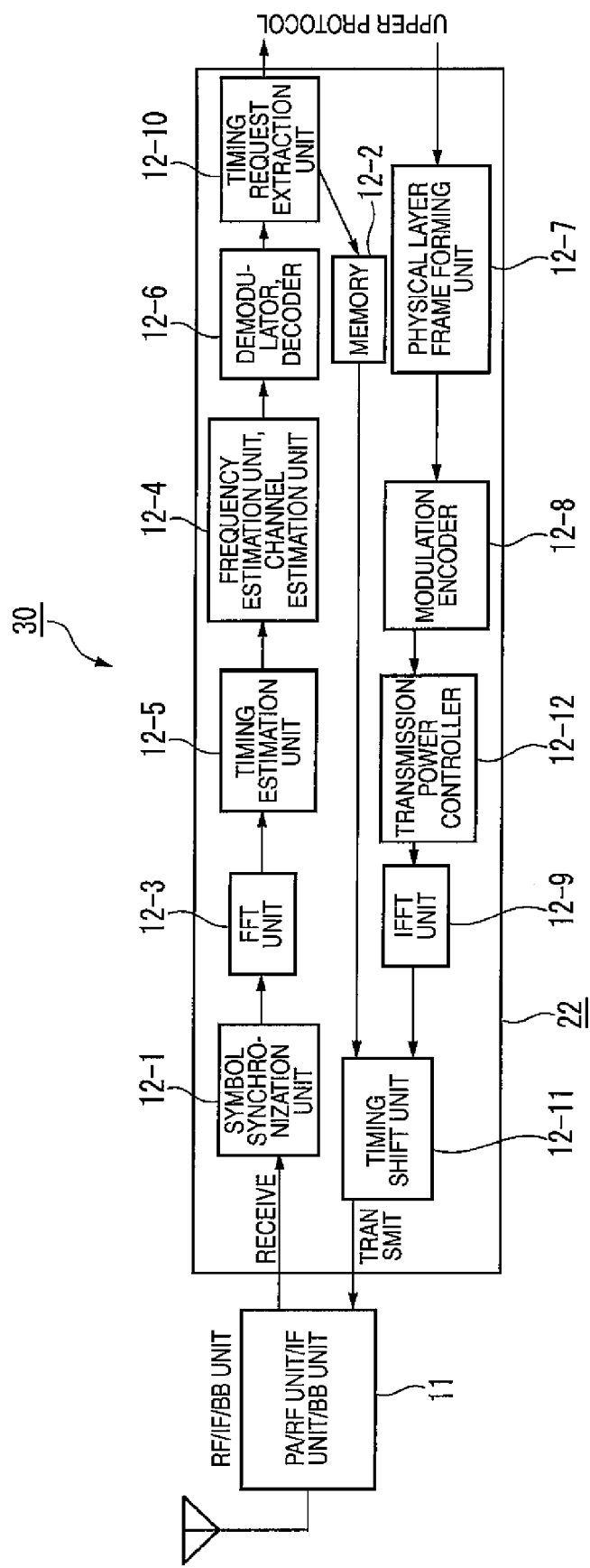
FIG. 5 is a functional block diagram of a terminal device of a second embodiment of the present invention.

Next, a functional configuration of the terminal device of the embodiment of the present invention will be described. FIG. 5 is a functional block diagram of the terminal device 30 of the embodiment of the present invention.

The terminal device 30 of the present embodiment includes a transceiver 11 (PA/RF unit/IF unit/BB unit) and a signal processor 22 which processes received signals.

In the transceiver 11, a signal received from the antenna passes through the RF unit and IF unit, and an OFDMA signal of a base band signal can be obtained.

The signal processor 22 includes a symbol synchronization unit 12-1, a memory 12-2, an FFT unit 12-3, a frequency estimation unit (channel estimation unit) 12-4, a timing estimation unit 12-5, a demodulator (decoder) 12-6, a physical layer frame forming unit 12-7, a modulation encoder 12-8, an IFFT unit 12-9, a timing request extraction unit 12-10, a timing shift unit 12-11 (transmission timing adjusting unit), a transmission power controller 12-12 (transmission power adjusting unit).

The transmission power controller 12-12 sets the intensity of the transmission power of the channel assignment request to be transmitted to the base station device 10 at the stage of CCH (control channel) before entering a communication channel. In the present embodiment, the transmission power can be raised in a phased manner from a low level to a high level.

The symbol synchronization unit 12-1 performs symbol synchronization of an OFDMA signal obtained from the transceiver 11, removes guard intervals (GI), and according to FFT performed by the FFT unit 12-3, extracts symbols from the OFDMA signal. Thereafter, the timing estimation unit 12-5 performs timing estimation, and the frequency estimation unit (channel estimation unit) 12-4 performs frequency estimation and channel estimation. Then, the demodulator (decoder) 12-6 performs demodulation and decoding to extract data, and the timing request extraction unit 12-10 extracts a transmission timing shift amount added to the channel assignment response and records it in the memory 12-2 (transmission timing recording unit), and performs error check and delivers the data to the upper layer.

The physical layer frame forming unit 12-7 forms physical layer frames of sub-channels, and the modulation encoder 12-8 performs encoding and modulation. Thereafter, the timing shift unit 12-11 controls a transmission timing of uplink information from the terminal device 30 according to the transmission timing shift amount (transmission timing request) stored in the memory 12-2, and the IFFT unit 12-9 applies IFFT and adds guard intervals (GI), and the data passes through DA and is converted into an analog signal, and then converted into an RF frequency signal through the IF unit and the RF unit of the transceiver 11, and transmitted from the antenna through the PA unit.

The timing estimation unit 2-5 of the base station device 10 calculates the correlation between a known symbol such as a pilot symbol PS or a preamble PR of each sub-channel and the received signal to estimate whether the received timing of receiving the channel assignment request from the terminal device 30 is earlier or later than a reference timing, that is, a desired timing of the base station device 10. The timing extraction unit 12-10 of the terminal device 30 extracts the transmission timing shift amount added to the channel assignment response from the base station device 10.

Timing detection by using a known symbol can also be performed by calculating the correlation with a known time axis waveform in a timing detection block before FFT (including the time before removing GI), for example, in the symbol synchronization unit 2-1.

Figure 6:
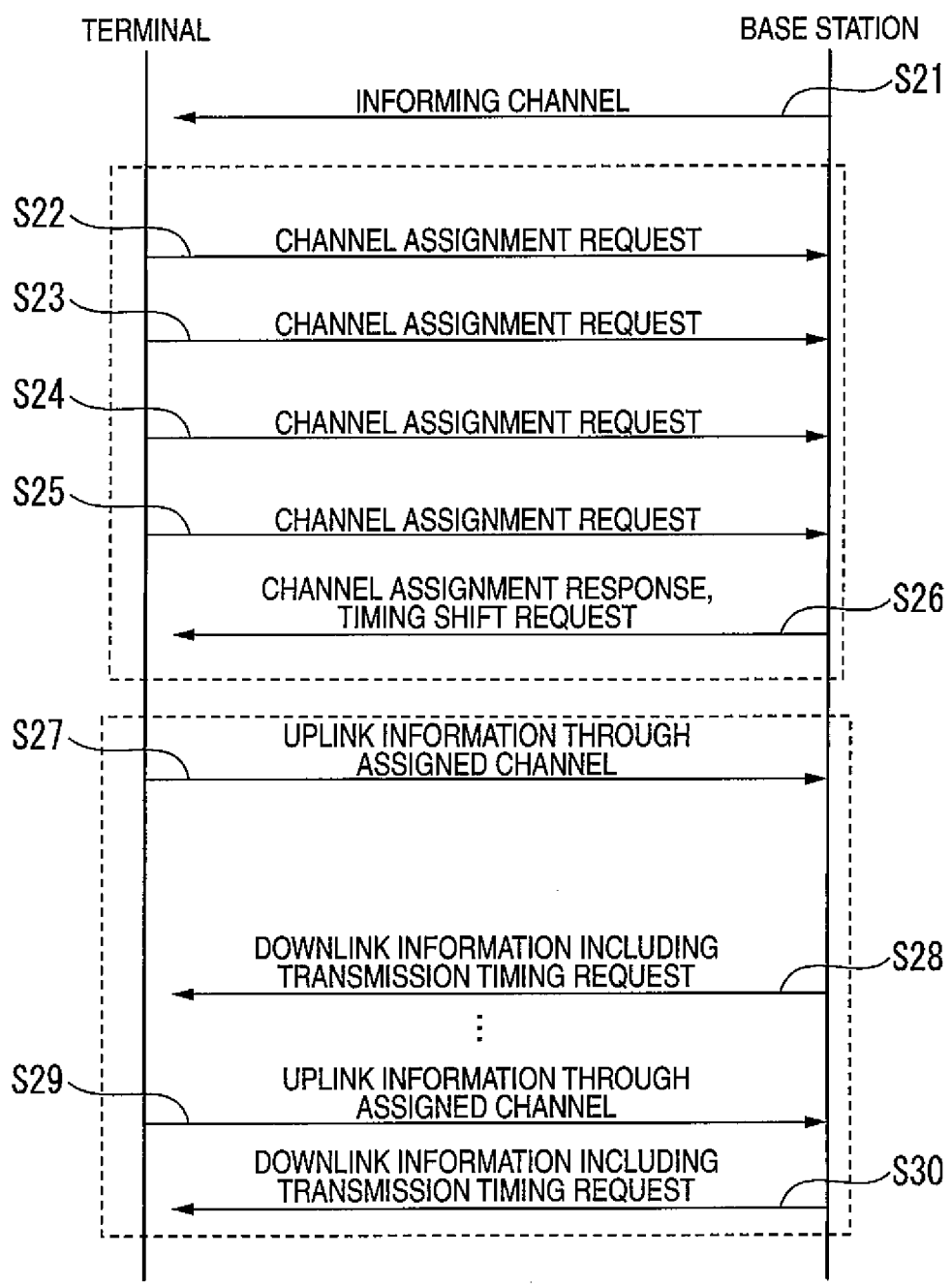
FIG. 6 is a flowchart describing first timing control processing to be performed between a base station terminal and the terminal device of the second embodiment of the present invention.

Next, a communication control method between the base station terminal 10 and the terminal device 30 of the present embodiment will be described in detail with reference to FIG. 6. FIG. 6 is a flowchart describing first timing control processing to be performed between the base station terminal 10 and the terminal device 30 of the present embodiment.

First, the terminal device 30 performs frame synchronization with an informing channel of the base station device 10 in advance (Step S21), and issues a channel assignment request to the base station device 10 (Step S22). At this time, the terminal device raises the transmission power in order from a low level (Step S23 to Step S25), and waits for a channel assignment response from the base station device 10. When the base station device 10 confirms the channel assignment request from the terminal device 30 (Step S25), it measures a difference between the received timing and a reference timing. The base station device adds the difference as a transmission timing shift amount to downlink information of the channel assignment response, and transmits it to the terminal device 30 (Step S26).

At the time of call connection, the terminal device 30 transmits the downlink communication quality condition of each channel to the base station device 10. The base station device 10 also monitors the uplink communication quality condition, and according to mutual communication quality conditions, assigns a channel with the best communication quality to the anchor sub-channel.

Here, the anchor sub-channel is a sub-channel to be used for notifying each terminal device of which terminal device uses which sub-channel, or used for negotiating whether the data has been correctly exchanged by re-transmission control between the base station device and the terminal device.

The terminal device 30 adjusts the timing so as to make transmission earlier according to the transmission timing shift amount in information in the channel assignment response, and transmits uplink information through an assigned channel (Step S27).

From Step S21 to Step S27, timing control at the stage of control channel before entering a communication channel is performed, and even after entering the communication channel after call connection is completed, timing control can be performed on the terminal device 30 side. Hereinafter, the timing control processing in the communication channel will be described.

The base station device 10 estimates an average received timing of the terminal device 30 based on a pilot symbol of the uplink information. When the estimated timing is late, it is set as a transmission timing control bit in the anchor sub-channel of downlink information of the terminal device 30 so as to perform transmission earlier to the terminal device 30. When the estimated timing is early, it is set as a transmission timing control bit in the anchor sub-channel of downlink information of the terminal device 30 so as to perform transmission later to the terminal device 30. The base station device 10 adds this transmission timing control bit and transmits the downlink information to the terminal device 30 together with other downlink information (Step S28).

The transmission timing control bit can include not only a single determination level of determining whether the transmission timing is made early or late, but also a plurality of determination levels of determining how much the transmission will be made early or late.

The terminal device 30 receives the downlink information, adjusts the transmission timing of uplink information according to the transmission timing bit of the anchor sub-channel, and transmits the uplink information through the assigned channel (Step S29). It is also possible that, after Step S27, concerning the uplink information (Step S29) transmitted from the terminal device 30 through the assigned channel, it is also estimated whether the received timing of receiving the uplink information is earlier or later than the reference based on a pilot symbol included in the uplink information, and the same processing as in Step S28 is repeated (Step S30).

Exemplary Variation of Second Embodiment

Figure 7:
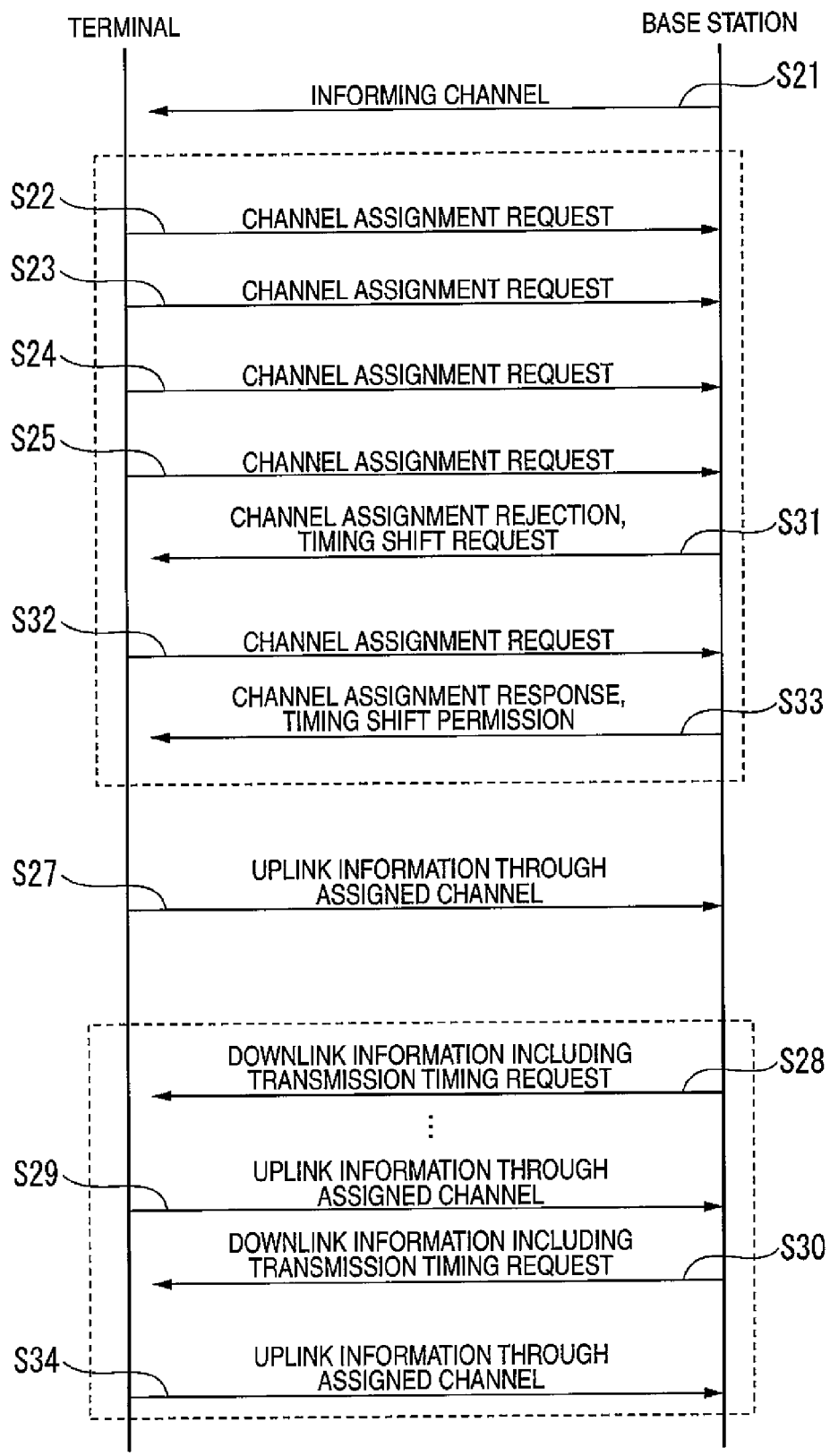
FIG. 7 is a flowchart describing second timing control processing to be performed between the base station terminal and the terminal device of the second embodiment of the present invention.
Figure 8:
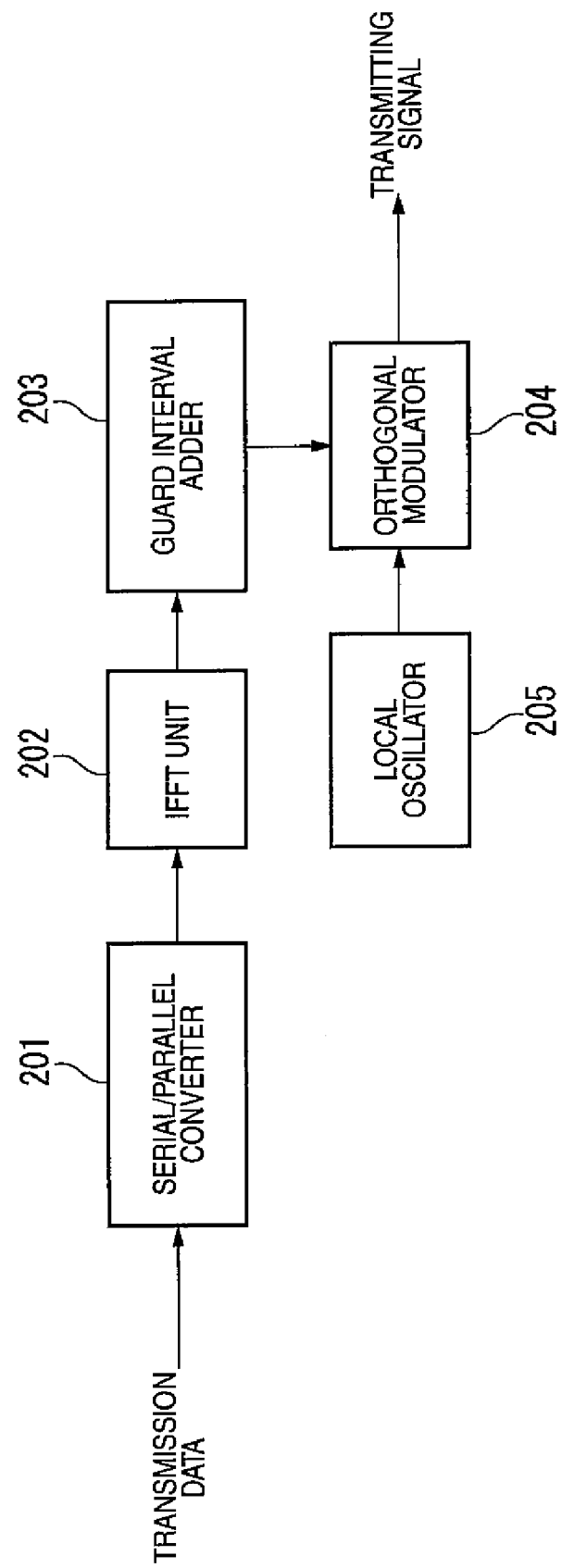
FIG. 8 is a block diagram showing a configuration of a conventional OFDM modulation device to be used for a transmission side.
Figure 9:
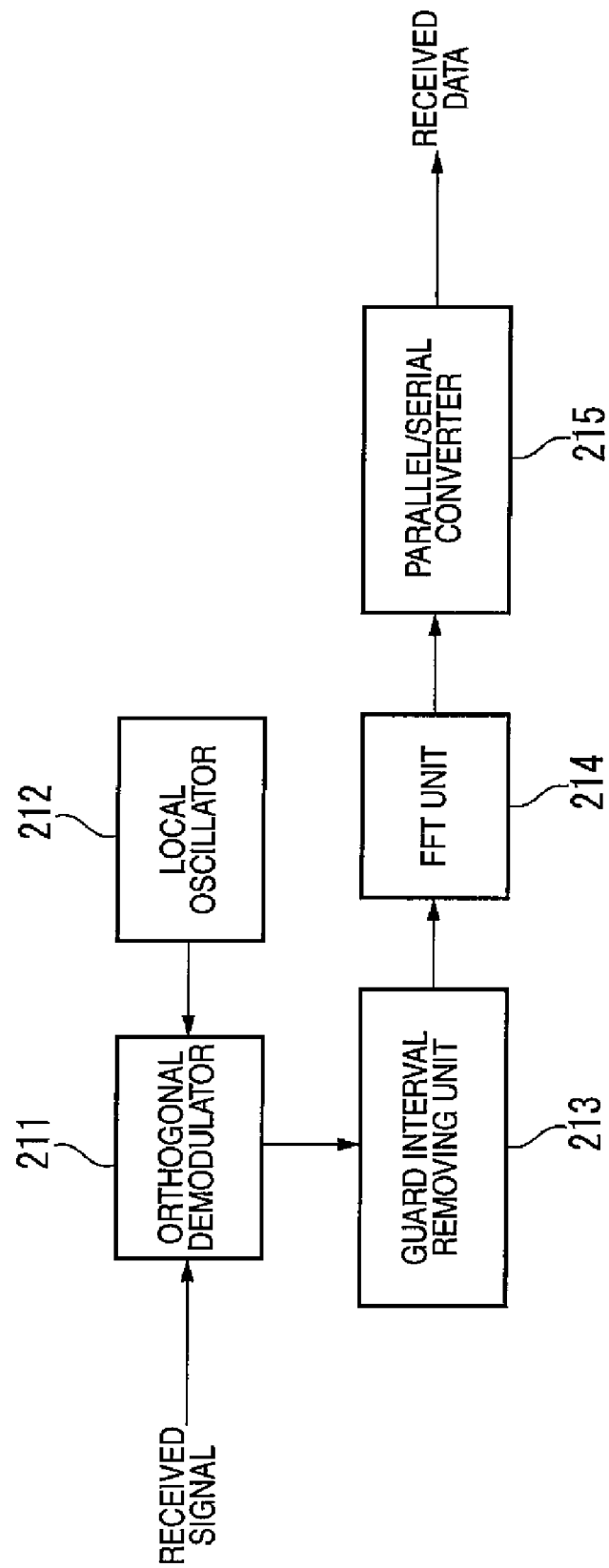
FIG. 9 is a block diagram showing a configuration of a conventional OFDM demodulation device to be used for a receiving side.
Figure 10:
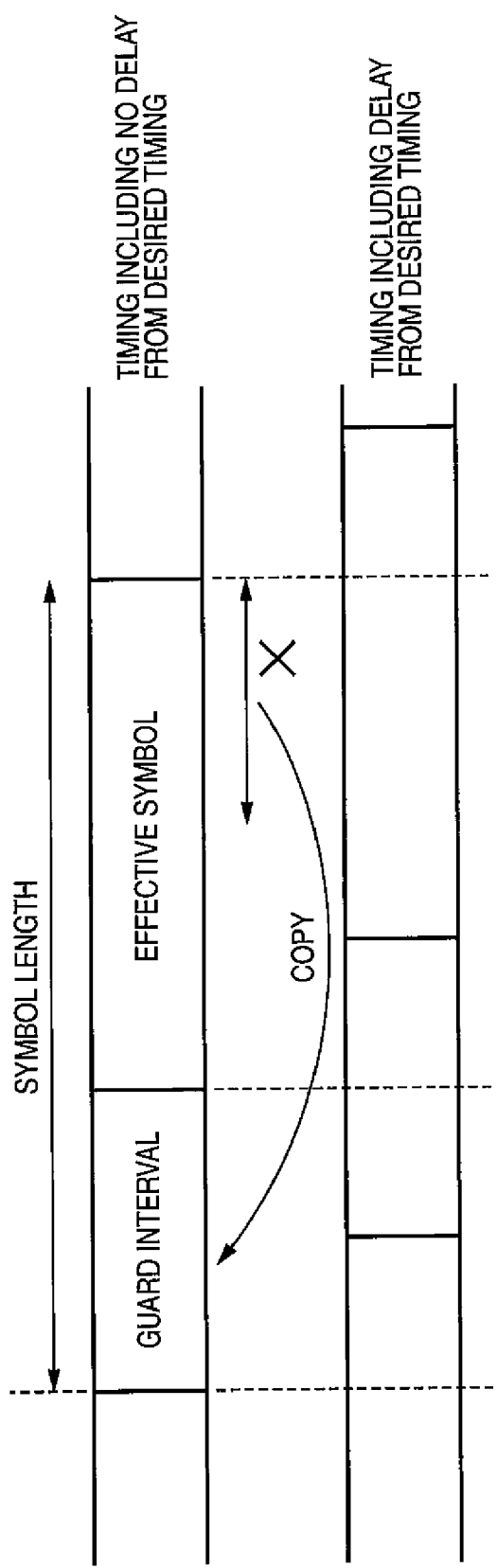
FIG. 10 is a schematic view describing a state where a guard interval is copied to an effective symbol.

Next, second timing control processing to be performed between the base station device 10 and the terminal device 30 of the present embodiment will be described. FIG. 7 is a flowchart describing second timing control processing.

In the second timing control processing, steps which are the same as in the first timing control processing are not described, and different processing steps are described.

In Step S25, when the base station device 10 confirms a channel assignment request from the terminal device 30, at this timing, the base station device 10 does not issue permission of state transition to the communication channel (does not output a channel assignment response), but transmits a channel assignment rejection to the terminal device 30 (Step S31). At this time, the base station device measures a difference between the received timing of the channel assignment request received in Step S25 and the reference timing, adds it as a transmission timing shift amount to downlink information of the channel assignment rejection, and transmits the downlink information to the terminal device 30 (Step S31).

The terminal device 30 which received the channel assignment rejection adjusts the timing according to the transmission timing shift amount added to the channel assignment rejection and transmits a channel assignment request again (Step S32). The base station device 10 confirms the channel assignment request again and detects a signal timing after timing adjustment, and confirms whether the timing is within an assumed range, and if it is within the assumed range, issues permission for entrance into the communication channel and a channel assignment response (Step S33).

Thus, according to the timing control processing of the present embodiment, after confirming a received timing of a channel assignment request transmitted from the terminal device 30 is a timing within an assumed range set in the base station device 10, a channel assignment response can be transmitted to the terminal device 30. Therefore, from the stage of the control channel before entering the communication channel, by matching the communication timings of the base station device 10 and the terminal device 30, dispersion of the received timing of a signal can be minimized. Therefore, the delay time can be suppressed within the range of the guard interval, so that inter-carrier interference can be prevented.

The invention claimed is:

1. A communication control method in which channel assignment responses are made in downlink information from a base station device by using a TDD-OFDMA communication method between the base station device and a plurality of terminal devices in response to channel assignment requests included in uplink information from the terminal devices, comprising:
   a step of estimating whether a received timing of receiving the uplink information is earlier or later than a reference based on a pilot symbol included in the channel assignment request when the base station device confirms the channel assignment request from the terminal device; and
   a step of transmitting, based on the received timing estimation result, the channel assignment response for rejecting channel assignment with an added transmission timing shift amount when the received timing of the channel assignment request is out of a reference range; and
   a step of transmitting the channel assignment response performing the channel assignment to the terminal device when the received timing of the channel assignment request is in the reference range.

2. The communication control method according to claim 1, further comprising:
   a step of raising the level of transmission power in a phased manner from a low level to a high level to transmit a channel assignment request from the terminal device to the base station device; and
   a step for transmitting the channel assignment response when the base station device confirms a channel assignment request from the terminal device.

3. The communication control method according to claim 1, further comprising:
   in the base station device,
   a step of recording the received timing estimation result in a timing recording unit; and
   a step of transmitting, when transmitting the channel assignment response for rejecting channel assignment from the base station device, the response to the terminal device with an added transmission timing shift amount based on content recorded in the timing recording unit, and
   in the terminal device,
   a step of extracting the received transmission timing shift amount;
   a step of recording the extracted transmission timing shift amount in the transmission timing recording unit; and
   a step of transmitting, when transmitting again the channel assignment request, uplink information from the terminal device to the base station device at a timing instructed by the transmission timing request recorded in the timing recording unit.

4. The communication control method according to claim 3, further comprising:
   a step of estimating a received timing of the uplink information transmitted from the terminal device by using the assigned channel assigned by the channel assignment response,
   a step of adding a transmission timing control bit to the downlink information based on a result of the estimating of the received timing; and
   a step of transmitting the uplink information by using the assigned channel with adjusting the transmitting timing of the uplink information, according to the transmission timing control bit added to the downlink information.

5. A base station device which makes channel assignment responses in downlink information to a plurality of terminal devices by using a TDD-OFDMA communication method in response to channel assignment requests included in uplink information from the terminal devices, comprising:
   a timing estimating unit for estimating, when the base station device confirms a channel assignment request transmitted by raising transmission power in a phased manner from a low level to a high level when a channel assignment request is transmitted from the terminal device, whether a timing of receiving the channel assignment request is earlier or later than a predetermined timing set in advance in the base station device based on a pilot symbol included in the channel assignment request;
   a timing recording unit for recording a transmission timing shift amount based on the estimation result; and
   a transmission timing shift amount adding unit for adding the transmission timing shift amount recorded in the timing recording unit to the channel assignment response for rejecting channel assignment when the received timing of the channel assignment request is out of the reference range, based on content recorded in the timing recording unit.

6. A terminal device which makes communication with the base station according to claim 5 by using a TDD-OFDMA communication method, comprising:
   a transmission power adjusting unit for raising transmission power in a phased manner from a low level to a high level to transmit a channel assignment request;
   a transmission timing recording unit for recording a received transmission timing request;
   a transmission timing adjusting unit for transmitting uplink information from the terminal device to the base station device at a timing instructed by the transmission timing request.

7. A communication control system which makes channel assignment responses in downlink information from a base station device by using a TDD-OFDMA communication method between the base station device and a plurality of terminal devices in response to channel assignment requests included in uplink information from the terminal devices, wherein
   the base station device comprises:
   a timing estimating unit for estimating, when the base station device confirms a channel assignment request transmitted by raising transmission power in a phased manner from a low level to a high level when a channel assignment request is transmitted from the terminal device, whether a timing of receiving the channel assignment request is earlier or later than a predetermined timing set in advance in the base station device based on a pilot symbol included in the channel assignment request;
   a timing recording unit recording a transmission timing shift amount based on the timing estimation result; and
   a transmission timing shift amount adding unit adding the transmission timing shift amount to the channel assignment response from the base station device based on content recorded in the timing recording unit, and the terminal device comprises:
a transmission power adjusting unit for raising transmission power in a phased manner from a low level to a high level to transmit the channel assignment request;
a transmission timing recording unit for recording a received transmission timing request;
a transmission timing adjusting unit for transmitting uplink information from the terminal device to the base station device at a timing instructed by the transmission timing request; and a transmission timing shift amount adding unit adding the transmission timing shift amount recorded in the timing recording unit to the channel assignment response for rejecting channel assignment when the received timing of the channel assignment request is out the reference range, based on content recorded in the timing recording unit.

* * * * *